United States Patent Office

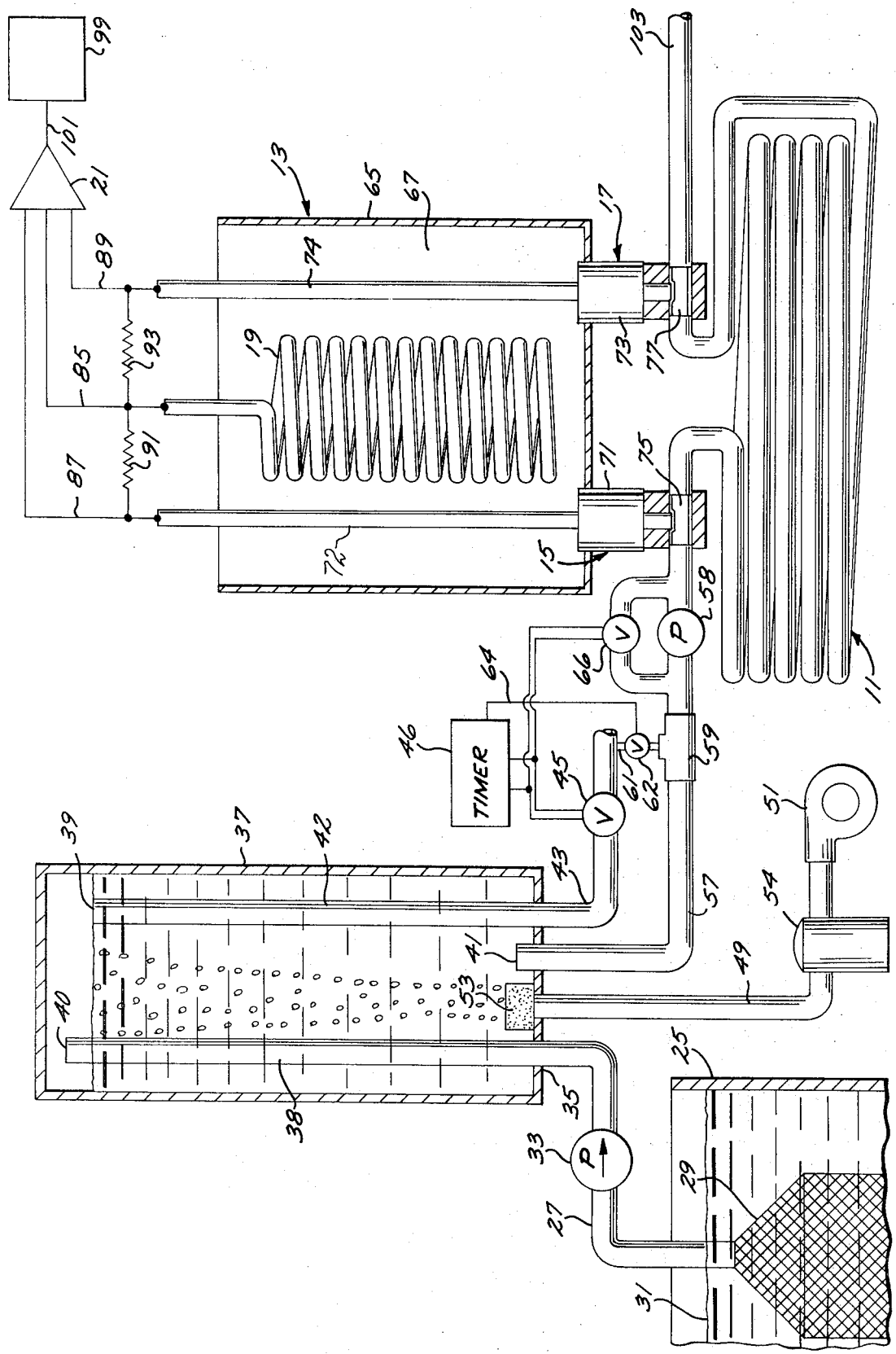

3,813,325
Patented May 28, 1974

---

3,813,325
CONTINUOUS RESPIROMETER APPARATUS
Kenneth C. Merrell, Brea, Timothy F. Scott, Fullerton, Gordon R. Brushwyler, Yorba Linda, James H. Koegel, Placentia, and William E. Poindexter, Santa Ana, Calif., assignors to Robertshaw Controls Company, Richmond, Va.
Filed July 27, 1972, Ser. No. 275,695
Int. Cl. G01n 27/46
U.S. Cl. 204—195 B  22 Claims

ABSTRACT OF THE DISCLOSURE

Improved continuous respirometer apparatus including an elongated residence tube having a relatively small cross-section and flow control means for controlling the flow rate of sewage through such tube at a selected rate. Oxygen sensing means is provided with first and second electrolytic sensing probes disposed at the upstream inlet and downstream outlet of such residence tube and cooperate with common electrolyte means to produce first and second electrical signals. Measurement means is connected with the oxygen sensing means for detecting the first and second signals to produce a measurable read-out indicating the difference between such signals whereby the first and second electrolytic sensing probes will cooperate with the common electrolyte to produce an output signal that is essentially unaffected by variations in such common electrolyte.

BACKGROUND OF THE INVENTION

Field of the invention

The present invention relates to a respirometer which may be utilized to continuously sense the rate of consumption of dissolved oxygen in sewage to thereby indicate the rate of bacterial activity in such sewage.

Description of the prior art

As indicated in Pat. No. 3,731,522, it has been common practice to monitor the population activity rate of bacteria in sewage to obtain an indication of the amount of bacteria food remaining in such sewage before it is released to a disposal area such as a lake or stream to avoid release of sewage while it contains an unacceptably high amount of bacteria food which may induce bacterial growth in such lake or stream, thus causing the multiplying bacteria to consume the oxygen therein and resulting in suffocation of all animal and plant life and consequent production of a dead body of water. The present-day standard test for determining the rate of bacterial consumption of dissolved oxygen in sewage is the five-day batch test commonly referred to as biochemical oxygen demand (B.O.D.) test wherein a sample of sewage is withdrawn from the body of sewage and the oxygen content thereof determined. The sample is then held for five days in a closed container and the oxygen content again tested and the results compared with the earlier results to determine the amount of bacterial oxygen consumption over the five-day prior. This procedure suffers the shortcoming that the actual rate of bacterial consumption of food in the sewage is not known until five days after sampling of the sewage and such delay often results in the inability to correct the sewage processing to compensate for any unwanted influences on the rate of bacterial food consumption. Additionally, if the bacteria population in the sewage sample taken is sufficient to totally consume the dissolved oxygen therein before the end of the five day holding period the resultant rate of bacterial consumption of dissolved oxygen obtained will be inaccurate and of little benefit.

In an article entitled "Methods for Measuring Aerobic Decomposition Activity of Activated Sludge in an Open System" published in the Jenkins edition of *Advances in Water Pollution Research*, 4th International Conference, Prague, Apr. 21–25, 1969, Pergamon Press, London, Dec. 4, 1969, pp. 309–317, Peter Farcas discloses a method of continuously sensing the oxygen content at two different locations along a flow path formed by a respirometer but such device is open to the atmosphere thereby permitting introduction of atmospheric oxygen thus introducing error due to the fact that the oxygen consumed during flow from the upstream to the downstream oxygen probe may be partially atmospheric oxygen and not totally dissolved oxygen contained in the sewage.

Further, respirometers of the batch type have been proposed which include a batch container for receiving a sample of sewage and having a probe assembly therein which includes upstream and downstream oxygen probes that may be utilized to determine the rate of oxygen consumption in the batch sample. A device of this type is shown in U.S. Pat. No. 3,510,407. Devices of this type suffer the shortcoming that the sewage in the treatment plant is not continuously monitored and any errors introduced as a result of non-uniformity of the upstream and downstream oxygen probes may be amplified, thereby introducing amplified error into the read-out.

SUMMARY OF THE INVENTION

The improved continuous respirometer apparatus of present invention is characterized by an elongated residence tube having oxygen sensing means for sensing the oxygen content of an oxygen containing fluid at both the upstream and downstream ends of such tube. The oxygen sensing means is in the form of a common electrolyte which cooperates with upstream and downstream oxygen sensing probes disposed at the inlet and outlet of the residence tube and are responsive to the oxygen content of fluid flowing therepast to cooperate with the common electrolyte to produce an output signal indicative of the rate of bacterial consumption of dissolved oxygen during fluid flow from the inlet to the outlet of the residence tube.

The objects and advantages of the present invention will become apparent from a consideration of the following detailed description when taken in conjunction with the accompanying drawing.

DESCRIPTION OF THE DRAWING

The single figure is a partially broken diagrammatic view of an improved continuous respirometer apparatus combining the present invention.

DESCRIPTION OF THE PREFERRED EMBODIMENT

The improved continuous respirometer apparatus of present invention includes, generally, an elongated coiled residence tube 11 and an oxygen sensor 13 including respective oxygen responsive cathodes forming respective upstream and downstream probes 15 and 17 which cooperate with a common electrode 19 to generate respective electrical signals proportionate to the oxygen content sensed for introduction to an amplifier 21 which amplifies the difference between such signals to produce an output representative of the rate of oxygen consumption during dwell time in the residence tube 11.

In sewage treatment plants it is common practice to hold sewage in large holding tanks 25 until the bacteria therein consumes a sufficient amount of the bacteria food to assure against undue multiplying of the bacteria once the sewage is released into a lake or stream to thereby prevent overpopulation of bacteria and resultant consumption of all the dissolved oxygen in such lake or stream and consequent suffocation of the surrounding sea life.

The improved continuous respirometer apparatus of present invention includes a supply line 27 leading from the sewage tank 25 and having a coarse screen filter 29 covering the inlet thereof for filtering sewage 31 drawn into such supply line to prevent clogging thereof. The supply line 27 includes a positive displacement pump 33 which has its outlet connected with the inlet 35 in the bottom of an aerator tank 37. The supply line 27 projects upwardly in the aerator tank 37 to form a stand pipe 38 terminating in its upper extremity in an inlet port 40. An overflow stand pipe 42 also projects upwardly in the aerator tank 37 and terminates at its upper end in an overflow port 39.

The overflow stand pipe 42 has a return conduit 43 connected with the bottom thereof. While such return conduit 43 is shown as terminating in a broken end, in practice it actually connects with the tank 25 for returning sewage thereto. The overflow conduit 43 includes a solenoid valve 45 therein which is connected with a timer 46 for selective closure for predetermined periods of time when the system is to be flushed as described hereinbelow.

An aerator pipe 49 leads from an air compressor 51 to the bottom of the aerator tank 37 and has the outlet thereof capped by means of a diffuser 53 which acts to break the bubbles emitted therefrom up into tiny segments for enhancing rapid and effective dissolving thereof into the sewage. The conduit 49 also includes an air filter 54 for filtering air supplied to the aerator tank 37.

A separator conduit 57 leads from the outlet port 41 to the inlet of a metering pump 58 and includes a T-fitting forming a bubble trap 59 having a bubble escape conduit 61 leading from the side thereof. The separator conduit 57 has a sufficiently large internal diameter to provide for a sufficiently slow flow rate to give air bubbles contained in the sewage sufficient time to raise upwardly therein to be collected in the bubble trap 59 for escape to the escape conduit 61. The escape conduit 61 leads to the return conduit 43 and includes a solenoid valve 62 which is connected with the timer 46 by means of a lead 64. The outlet from the metering pump 58 is connected with the inlet to the inlet oxygen probe 15 and has a solenoid operated bypass valve 66 connected thereacross.

The oxygen sensor 13 is in the form of a single housing 65 having a conventional electrolytic solution 67 therein. Disposed centrally in the electrolytic solution 67 is the anode 19 which serves as a common electrode for the respective inlet and outlet oxygen sensing probes 15 and 17, such probes including respective cathodes 72 and 74. Projecting downwardly from the bottom wall of the oxygen sensor 13 are a pair of sensing fittings 71 and 73 which form the respective inlet and outlet of the residence tube 11 and have the respective cathodes 72 and 74 projecting downwardly therein. The tips of the probes 15 and 17 project downwardly through respective bores in the walls of the respective fittings 71 and 73 and terminate in ends which fare in with the surfaces of the interior walls of such fittings to provide a substantially continuous smooth surface to prevent the formation of any depressions or projections on which residue may build up.

The sensing ends of the probes 15 and 17 are in the form of permeable Teflon membranes and the fittings 71 and 73 are formed with reduced-in-diameter flow chambers 75 and 77 to accelerate fluid flowing thereby to establish a fast flow rate to maintain such membranes clear of residue and prevent the buildup of a boundary layer thereover of oxygen dissipated sewage which may result in a false reading thereby assuring exposure of the desired oxygen-containing fluid to such membranes.

The outputs from the anode 19 and cathodes 72 and 74 are connected with the input to the amplifier by means of leads 85, 87 and 89. Connected between the anode lead 85 and cathode leads 87 and 89 are resistors 91 and 93. The output from such amplifier 21 is connected with a combination visual meter and recorder 99 by means of a lead 101.

In the preferred embodiment, the residence tube 11 is constructed from a 5/8 inch inside diameter tube which is 50 feet in length to provide the desired residence time therein for an accurate indication of the rate of consumption of dissolved oxygen during flow through such tube. Conveniently, the tube 11 is formed in a coil to provide a relatively compact package and to dispose the probes 15 and 17 in close spaced relationship so they will be exposed to substantially the same environmental temperature to be equally affected by any temperature changes to thereby minimize the introduction of error as a result of temperature changes.

The outlet from the residence tube 11 is connected with a slightly restricted diameter dump conduit 103 leading to a dump area to thereby provide for a slight flow resistance to assure that the residence tube 11 is maintained full.

In operation, the timer 46 is energized to commence periodic opening and closing of the overflow valve 45 and concurrent closure and opening of the metering pump bypass valve to periodically flush the residence tube 11 with a mixture of high pressure sewage and air. The supply pump 33 and amplifier 21 are also energized.

The positive displacement supply pump 33 is selected to pump sewage into the aerator 37 at a rate greater than the flow rate through the residence tube 11 to thereby maintain an adequate supply in the aeration chamber 37 to assure a constant supply of sewage to the metering pump 58 to thereby maintain the fluid flow through the residence tube 11 at a constant rate during sensing of the oxygen content thereof.

The air compressor 51 continually pumps air into the bottom of the aerator tank 37 through the aeration tube 49 to assure an oxygen content in the sewage entering the residence tube 11 that will be sufficient to maintain the oxygen content at the outlet of such residence tube above approximately one part per million irrespective of the rate at which bacteria therein consume such oxygen to assure an oxygen level that is readily detectable by the outlet oxygen probe 17.

Direct communication of such air from the aeration tube 49 to the outlet port 41 is prevented since air bubbled through the air diffuser 53 rises in the tank 37 thus moving away from the outlet port 41.

Any undissolved oxygen remaining in the sewage withdrawn from the tank 37 and introduced into the separator tube 57 will rise within the bubble trap 59 to escape therefrom through the bubble conduit 61 for return to the sewage tank 25.

Sewage from the bubble trap 59 is pumped through the metering pump 66 at a constant rate and is introduced to the inlet oxygen sensing probe 15 and the partial pressure of any oxygen therein will cause a proportionate amount of current flow from the anode 19 through resistor 91 and back to the cathode 72, thus providing a proportionate voltage drop across such resistor 91. The sewage will then flow through the residence tube 11 to provide a dwell time therein of approximately one minute, and the oxygen content of the sewage passing from the outlet of such tube will be detected by the outlet probe 17 to establish a proportionate voltage drop across the resistor 93, it being noted that the proportionate voltages at the outer ends of the resistors 91 and 93 are fed to the amplifier 21 through the respective leads 87 and 89 to provide an amplified differential input to the recorder 99 to indicate the rate at which the oxygen in the sewage was consumed during the dwell time in the residence tube 11. It will be appreciated that the relatively small cross sectional flow area of the residence tube 11 assures that there will be no stagnant sewage therein so the entire body of sewage flowing therethrough flows at a continuous rate to provide an accurate indication of the actual rate of oxygen consumption in such sewage. The sewage from the outlet of the residence tube 11 will flow through the dump tube 103.

It is particularly important that the anode 19 is common to both cathodes 72 and 74 to thereby assure that the read-outs from both cathodes are equally affected by any fluctuation in temperature or physical characteristics affecting the anode 19 to minimize introduction of error. This overcomes the shortcoming of prior art respirometer devices wherein the individual amplifiers were provided for the inlet and outlet probes and the individual drifts of such amplifiers were frequently greater than the measured parameter, thereby giving a totally confusing and inaccurate output.

At preset intervals the control panel 46 closes the aeration overflow valve 45 and bubble return valve 61, while opening the metering pump bypass valve 66 to enable the air compressor 51 to pressurize the aeration tank 37 to provide a high flow rate through the residence tube for cleaning thereof. The pressure in the tank 37 will force the sewage therefrom thus blowing undissolved air into the residence tube 11. It has been determined that continued pumping of the supply pump 33 and flow from the air compressor 51 provides a surging effect in the metering tube 57 and residence tube 11 to provide for periodic pulses of air and sewage flow to thereby give a good scrubbing action to assure cleaning of the entire system and, particularly, the Teflon membranes covering the ends of the probe cathodes 72 and 74 to provide for continued reliable operation of the system. With the bubble escape valve 62 closed, escape of air directly into the overflow tube 43 is avoided to maintain the residence tube 11 pressurized during the flush period. Once the flush period is completed the timer 46 de-energizes the overflow valve 45 and bubble escape valve 62 to re-commence steady rate of sewage flow through the residence tube 11 to continue sensing the rate at which oxygen dissolved therein is consumed.

From the foregoing it will be apparent that the improved continuous respirometer of present invention provides an accurate and convenient means for continually monitoring the rate of consumption of dissolved oxygen in sewage and overcomes shortcomings of prior art systems wherein large cross section residence chambers were utilized and separate anodes were used for each cathode probe. Further, automatic periodic flushing of the system is provided to assure continued accurate sensing of the oxygen content in the sewage.

Various modification and changes may be made with regard to the foregoing detailed description without departing from the spirit of the invention.

What is claimed is:

1. Improved continuous respirometer apparatus for continuously measuring the respiration rate of a respirating population in a body of liquid effluent comprising:
   a housing formed with a continuous residence chamber having a known volume and leading from an upstream inlet to a downstream outlet for receipt therein of a continuous stream of said effluent;
   inlet and outlet oxygen sensing probes disposed adjacent said respective inlet and outlet for detecting the oxygen content in said stream as it flows past said inlet and outlet probes, said probes being responsive to the oxygen content detected to produce corresponding electrical signals;
   supply means including conduit means connected with said body of liquid effluent and with said inlet for supplying a sample of said liquid effluent to said residence chamber, thereto;
   oxygenating means connected with said conduit means upstream of said residence chamber for supplying oxygen to said effluent sample;
   a bubble trap including an escape chamber leading upwardly from said conduit means downstream of said oxygenation means intermediate the connection with said oxygenating means and said inlet probe for trapping bubbles of undissolved oxygen introduced to said effluent by said oxygenating means;
   flow control means for controlling effluent flow through said residence chamber at a selected rate to provide said continuous stream leading between said inlet and outlet probes; and
   measurement means connected with said sensing probes and including means responsive to said electrical signals to provide an output proportionate to the rate of reduction of oxygen in said continuous sample.

2. Improved continuous respirometer apparatus as set forth in claim 1 wherein:
   said oxygen sensing means includes electrolyte means common to said electrolyte sensing probes.

3. Improved continuous respirometer apparatus as set forth in claim 2 wherein:
   said residence tube is wrapped in a coil to form a compact package with said outlet probe disposed proximate said inlet probe so said probes will be exposed to similar environmental temperatures.

4. Improved continuous respirometer apparatus as set forth in claim 1 wherein:
   said apparatus includes fluid acceleration means disposed adjacent said sensing probes.

5. Improved continuous respirometer apparatus as set forth in claim 4 wherein:
   said fluid acceleration means includes reduced in cross section chambers disposed adjacent said respective probes for accelerating flow therepast.

6. Improved continuous respirometer apparatus as set forth in claim 1 that includes:
   a single housing encasing said oxygen sensing means to maintain said first and second sensing probes in heat exchange relationship with one another to thereby reduce temperature-induced error in said read-out.

7. Improved continuous respirometer apparatus as set forth in claim 1 that includes:
   screen means disposed upstream of said inlet for screening said fluid before it enters said residence tube means.

8. Improved continuous respirometer apparatus as set forth in claim 1 that includes:
   an aerator connected with said inlet for introducing oxygen to said fluid.

9. Improved continuous respirometer apparatus as set forth in claim 1 wherein:
   said flow control means includes a metering pump connected with said residence tube means.

10. Improved continuous respirometer apparatus as set forth in claim 1 wherein:
    said flow control means includes a metering pump connected with said residence tube; and
    said apparatus includes bypass valve means for selectively bypassing said metering pump.

11. Improved continuous respirometer apparatus as set forth in claim 1 that includes:
    air pump means connected with said inlet for pumping air through said residence tube means to flush said apparatus.

12. Improved continuous respirometer apparatus as set forth in claim 1 that includes:
    a fluid pump connected with said inlet for pumping fluid through said residence tube means at a rate greater than said selected rate for affecting a flush of said apparatus.

13. Improved continuous respirometer apparatus as set forth in claim 1 that includes:
    flush means including fluid pump means connected with said supply means for introducing fluid under pressure to said residence tube means for flushing of said apparatus.

14. Improved continuous respirometer apparatus as set forth in claim 1 wherein:
    said residence tube means is formed with an elongated residence chamber having a length at least ten times greater than its maximum cross sectional width.

15. Improved continuous respirometer apparatus as set forth in claim 1 wherein:
said apparatus is formed with a closed flow stream leading from said supply means and through said residence chamber and that includes flush means for introducing fluid under high pressure into said flow stream to establish a high flow rate through said flow stream for flushing thereof.

16. Improved continuous respirometer apparatus as set forth in claim 1 that includes:
flush means connected with said tank means and including means for pumping flush fluid under high pressure into said tank means and valve means connected with said overflow port for selective closure when said flush means is operated to enable said tank means to be pressurized with said flush fluid to flow said flush fluid through said residence tube means at a high rate of flow.

17. Improved continuous respirometer apparatus as set forth in claim 1 wherein:
said supply means includes an aerator tank, a high volume pump pumping said effluent into said aerator tank, an overflow conduit having an inlet elevated from the bottom of said aerator tank for removing overflowing effluent therefrom and wherein:
said flow control means includes a low volume pump in said conduit means for controlling the rate of effluent flow to said residence chamber.

18. Improved continuous respirometer apparatus comprising:
a closed elongated residence tube formed with an elongated continuous residence chamber having a known volume and a length exceeding ten times its maximum cross sectional width and leading from an upstream inlet to a downstream outlet;
inlet and outlet oxygen sensing probes disposed adjacent said respective inlet and outlet for detecting the oxygen content in fluid flowing through said residence chamber and responsive to the content detected to produce corresponding electrical signals;
supply means including conduit means connected with said inlet for supplying an oxygen-containing fluid thereto;
aeration means connected with said conduit means for aerating fluid flowing therethrough;
a bubble trap including an escape chamber leading upwardly from said conduit means downstream of said aeration means;
fluid control means for controlling the rate of fluid flow through said residence chamber; and
measurement means connected with said sensing probes and including means responsive to said electrical signals to produce a proportionate detectable output whereby said flow control means may be operated to flow a continuous stream of said fluid through said residence tube at a selected rate so said inlet and outlet probes will detect the drop in oxygen content of said fluid during a known time lapse to obtain a readout indicating the rate of reduction of oxygen in said fluid.

19. Improved continuous respirometer apparatus comprising:
closed residence tube means formed with a residence chamber having a known volume and including an upstream inlet and a downstream outlet;
inlet and outlet oxygen sensing probes disposed adjacent said respective inlet and outlet for detecting the oxygen content in said fluid and responsive to the content detected to produce corresponding electrical signals;
supply means for supplying an oxygen-containing fluid to said inlet;
delivery means formed with a closed flow path leading from said supply means to said inlet;
combination flush and aeration means connected with said delivery means and including a high pressure oxygenated gas supply means for supplying high pressure oxygenated gas to said residence tube and further including flow control means having a normal flow rate for aerating said test fluid and a high flow rate for introducing said gas into said residence tube at a high flow rate to flush residue from said probes and tube; and
measurement means connected to said probes and including means responsive to said electrical signals to produce a proportionate detectable output whereby said output will be directly indicative of the rate of oxygen reduction in said fluid and said flush means may be energized periodically to introduce said flush fluid under high pressure to said residence tube to flush said probes clear of residue and the like.

20. Improved continuous respirometer apparatus as set forth in claim 19 wherein:
said flush and aeration means includes surge means for simultaneously introducing said fluid and gas at a rate sufficient to cause surging thereof in said residence tube.

21. Improved continuous respirometer apparatus as set forth in claim 19 wherein:
said high pressure gas supply means includes an air compressor for supplying air to said oxygen-containing fluid under normal operating conditions for aeration thereof.

22. Improved continuous respirometer apparatus as set forth in claim 19 wherein:
said flow control means includes an aerator tank having an inlet connected with said supply means and an overflow port disposed a selected distance above an outlet;
said flush and aeration means includes valve means connected with said overflow port for selective closure when said flush means is actuated to flush said tube to prevent escape of said flush fluid.

References Cited

UNITED STATES PATENTS

| | | | |
|---|---|---|---|
| 3,510,406 | 5/1970 | Stack | 204—1 T |
| 3,542,662 | 11/1970 | Hicks et al. | 204—195 P |
| 3,275,541 | 9/1966 | Strong | 204—195 |
| 3,360,451 | 12/1967 | Stack | 204—195 P |
| 3,510,407 | 5/1970 | Stack | 204—1 T |
| 3,676,321 | 7/1972 | Cummings et al. | 204—195 R |

GERALD L. KAPLAN, Primary Examiner

U.S. Cl. X.R.

204—195 R, 195 P